(No Model.)
R. H. WOLFF.
VELOCIPEDE PROVIDED WITH ELECTRICAL COMMUNICATING APPARATUS.
No. 536,411. Patented Mar. 26, 1895.
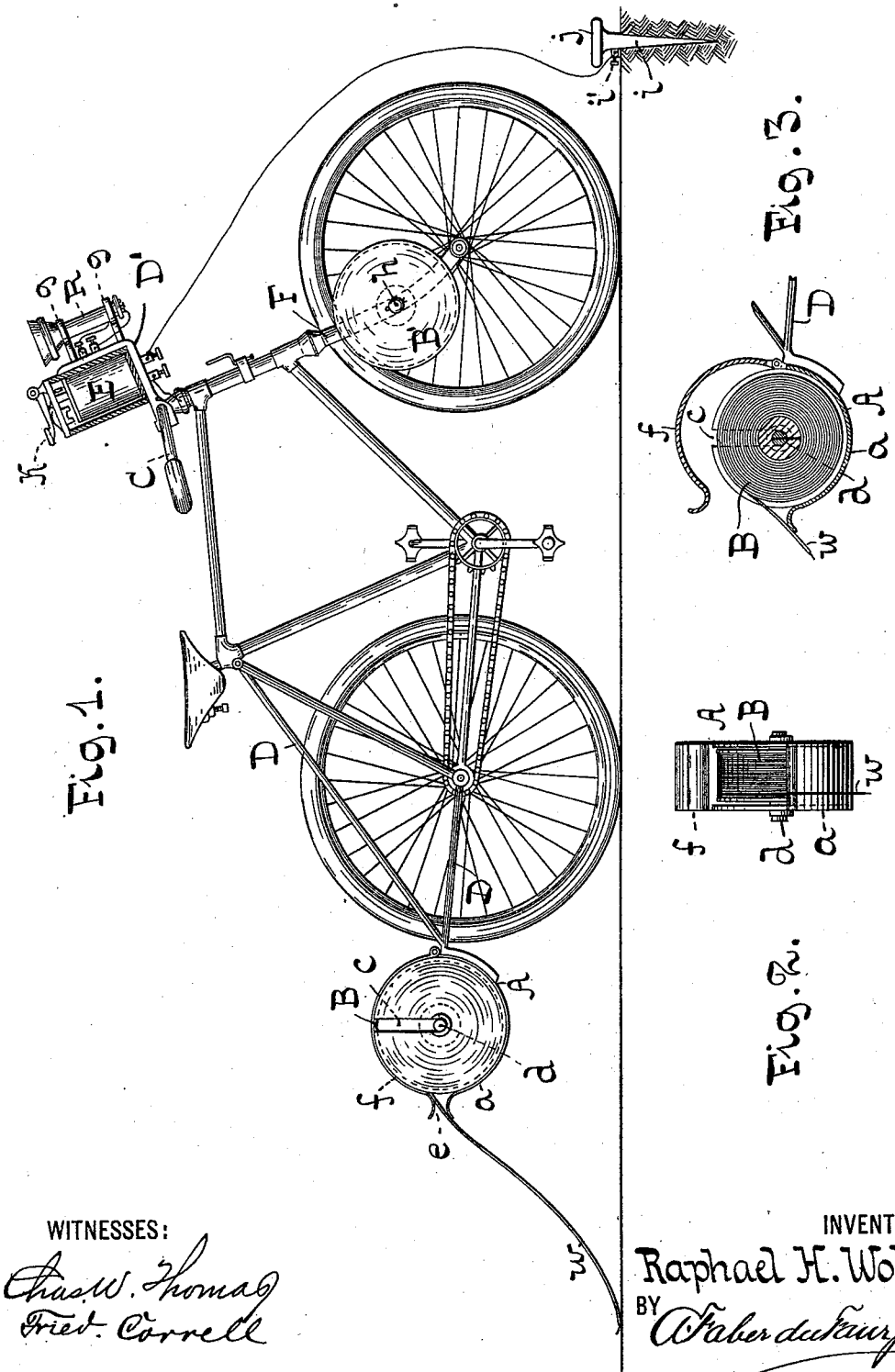

UNITED STATES PATENT OFFICE.

RAPHAEL H. WOLFF, OF NEW YORK, N. Y.

VELOCIPEDE PROVIDED WITH ELECTRICAL COMMUNICATING APPARATUS.

SPECIFICATION forming part of Letters Patent No. 536,411, dated March 26, 1895.

Application filed August 18, 1894. Serial No. 520,709. (No model.)

*To all whom it may concern:*

Be it known that I, RAPHAEL H. WOLFF, a citizen of the United States of America, and a resident of New York, in the county and State of New York, have invented certain new and useful Improvements in Velocipedes Provided with Electrical Communicating Apparatus, of which the following is a specification.

My invention has reference to improvements in velocipedes and especially to a bicycle for military purposes. It has for its object to provide a bicycle containing complete means for establishing an electric telegraph or telephone circuit to afford communication between outlying posts, &c.

To this end my invention consists essentially in a bicycle, or other velocipede, provided with a support for a reel of wire, and with electric communicating apparatus, all constructed to co-operate in establishing and working a temporary line.

The nature of my invention will best be understood when described in connection with the accompanying drawings, in which—

Figure 1 represents a side elevation of a bicycle embodying my invention. Fig. 2 is an end elevation of the reel support and reel. Fig. 3 is a sectional side elevation of the same.

Similar letters of reference designate corresponding parts.

Referring to the drawings, the letter A designates a support for a reel B of insulated wire w. In this instance I have shown said support to consist of a metallic casing a supported by tubular members D secured to the frame of the bicycle. The casing a is provided with radial slots c in its sides to receive the pintle d of the reel B; and is closed, with the exception of an orifice e for the passage of the wire, by a hinged cover f. In this manner the wire is kept dry, and also free from injury by abrasion.

On the handle-bar C (Fig. 1) of the bicycle is secured a bracket D' constructed to hold the necessary equipments for establishing a complete telegraphic line, as well as a telephonic line, if desired. Any suitable telegraphic transmitting instrument, such as the key, K, and a suitable receiving instrument are mounted on this bracket in as compact a manner as possible, preferably on the cover of the casing inclosing the battery E.

When the bicycle is supplied with telephonic apparatus, the receiver R is preferably suspended by holders g from the front of the bracket. The construction of telegraphic and telephonic instruments being well known, it is not considered necessary to enter into a detailed description of the same. Any suitable construction may be employed for throwing either the telephone or telegraphic apparatus into the circuit.

In laying the temporary line, the end of the wire w on the reel B is made fast at headquarters, and, as the rider goes forward the wire is unreeled. The rider, from time to time, secures the wire to some convenient object, such as a tree, either directly, or by the use of suitable insulators. To enable a long line to be laid, the bicycle is provided at convenient points with means for holding one or more extra reels B' of wire. In the example illustrated, I have shown the steering fork F provided on opposite sides with studs h on which the reels B' can be placed and secured. At the end of the line the rider grounds the battery wire by the use of a suitable plate i provided with a binding post i', to which latter one wire from the battery is secured. The plate is preferably provided with a head j, in order that it can be driven into the ground.

The end of the wire w may be secured in the pintle of the reel, and placed in electrical connection with the battery through the metallic frame of the bicycle, in which case the rubber tires of the bicycle will give a perfect insulation from the ground; or, at the end of the line, the wire may be cut and secured directly to the binding post at the battery.

With a wheel constructed as herein described a telegraphic, or telephonic, circuit can be quickly established between headquarters and outlying posts, or between two or more outlying posts; and reports received and instructions given with great facility.

I do not wish to restrict myself to the particular means illustrated for supporting the reel, or the telegraphic apparatus, or to the location of such parts, since it is evident that the same can be altered without departing from the spirit of my invention.

What I claim as new is—

1. The combination with a velocipede, of a reel support attached to and in electrical connection with the frame, a battery mounted on the frame and having one pole in connection with the same, and electrical communicating apparatus, substantially as described.

2. A velocipede of the character set forth provided with a slotted casing to receive a reel, and a hinged cover for said casing, substantially as described.

3. A velocipede of the character set forth provided with a reel support and with electrical communicating apparatus, substantially as described.

4. A velocipede of the character set forth provided with a reel support fixed to a rearward extension of the frame, and with electrical communicating apparatus, substantially as described.

5. A velocipede of the character set forth provided with a reel support fixed to a rearward extension of the frame, one or more additional supports for extra reels, and electrical communicating apparatus, substantially as described.

6. A velocipede of the character set forth provided with a reel support fixed to a rearward extension of the frame, and electrical communicating apparatus attached to the handle-bar, substantially as described.

7. A velocipede of the character set forth provided with a reel support, a reel having its wire placed in electrical contact with the pintle, and electrical communicating apparatus, substantially as described.

In testimony that I claim the foregoing as my invention I have signed my name, in presence of two witnesses, this 26th day of July, 1894.

RAPHAEL H. WOLFF.

Witnesses:
   THOS. HAWDLOSEN,
   J. H. FRANKFURTER.